United States Patent
Grosch et al.

(10) Patent No.: US 10,564,636 B2
(45) Date of Patent: Feb. 18, 2020

(54) METHOD AND ARRANGEMENT FOR OPERATING TWO REDUNDANT SYSTEMS

(71) Applicant: Siemens Aktiengesellschaft, Munich (DE)

(72) Inventors: Thomas Grosch, Rosstal (DE); Walter Maximilian, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 2 days.

(21) Appl. No.: 16/032,433

(22) Filed: Jul. 11, 2018

(65) Prior Publication Data

US 2019/0018401 A1 Jan. 17, 2019

(30) Foreign Application Priority Data

Jul. 13, 2017 (EP) .................................... 17181169

(51) Int. Cl.
 *G05B 23/02* (2006.01)
 *G05B 9/03* (2006.01)
 (Continued)

(52) U.S. Cl.
 CPC ........... *G05B 23/0221* (2013.01); *G05B 9/03* (2013.01); *G05B 19/0425* (2013.01);
 (Continued)

(58) Field of Classification Search
 CPC ............ G05B 19/0425; G05B 19/0428; G05B 19/058; G05B 2219/24182;
 (Continued)

(56) References Cited

U.S. PATENT DOCUMENTS 6,356,795 B1 * 3/2002 Barthel ..................... G05B 9/03
 700/82
6,820,213 B1 * 11/2004 Somers ................. G06F 11/165
 714/11
(Continued)

FOREIGN PATENT DOCUMENTS

| DE | 102010039607 | 11/2011 |
|----|--------------|---------|
| DE | 102012012521 | 1/2014 |
| EP | 3048497 | 7/2016 |

OTHER PUBLICATIONS

Willhalm et al., Intel Performance Counter Monitor—A better way to measure CPU Utilization, pub. Aug. 16, 2012.

*Primary Examiner* — Michael J Huntley
(74) *Attorney, Agent, or Firm* — Cozen O'Connor

(57) ABSTRACT

A method and an arrangement having redundant systems operating in parallel in a cyclic mode and reciprocally checking a result of the task of the other system on a regular basis, and wherein one system is selected or confirmed for the productive mode in the fault situation found, where a characteristic variable concerning an operating parameter is picked up for each of the systems in multiple/all cycles and used for updating statistical parameters, where at least when a disparity between results of the two systems is found, a current operating parameter is correlated with the statistical parameter for each system, and where the system for which the current operating parameter differs from the statistical parameter less is detected as the correctly operating system and used for the productive mode such that the degree of fault coverage can be increased and hence the availability of the overall system increased.

15 Claims, 2 Drawing Sheets

(51) Int. Cl.
   *G05B 19/042* (2006.01)
   *G06F 11/20* (2006.01)
(52) U.S. Cl.
   CPC ........ *G05B 19/0428* (2013.01); *G06F 11/202*
   (2013.01); *G05B 2219/24182* (2013.01); *G05B*
   *2219/24195* (2013.01)
(58) Field of Classification Search
   CPC ...... G05B 2219/24195; G05B 23/0221; G05B
   9/00; G05B 9/03; G06F 11/1629; G06F
   11/1633; G06F 11/165; G06F 11/1654;
   G06F 11/202
   See application file for complete search history.

(56) References Cited

U.S. PATENT DOCUMENTS

| | | | | |
|---|---|---|---|---|
| 7,752,494 | B2* | 7/2010 | Del Vigna, Jr. | G06F 9/3851 |
| | | | | 712/204 |
| 7,802,075 | B2* | 9/2010 | Bourdon | G06F 9/52 |
| | | | | 712/34 |
| 9,389,971 | B2* | 7/2016 | Grosch | G05B 9/03 |
| 2002/0026604 | A1* | 2/2002 | Bissett | G06F 11/1633 |
| | | | | 714/12 |
| 2002/0066054 | A1* | 5/2002 | Jaw | G05B 9/03 |
| | | | | 714/48 |
| 2003/0034786 | A1* | 2/2003 | Kim | G05B 9/03 |
| | | | | 324/613 |
| 2006/0162986 | A1* | 7/2006 | Disser | B60T 8/885 |
| | | | | 180/402 |
| 2006/0212677 | A1* | 9/2006 | Fossum | G06F 1/3237 |
| | | | | 712/1 |
| 2007/0067674 | A1* | 3/2007 | Essame | G06F 11/0796 |
| | | | | 714/14 |
| 2007/0128895 | A1* | 6/2007 | Kleyer | G05B 19/0428 |
| | | | | 439/76.1 |
| 2009/0094481 | A1* | 4/2009 | Vera | G06F 1/206 |
| | | | | 714/11 |
| 2013/0297044 | A1* | 11/2013 | Erhardt | G05B 9/03 |
| | | | | 700/20 |
| 2014/0032169 | A1* | 1/2014 | McCarthy | G05B 19/4184 |
| | | | | 702/182 |
| 2014/0082617 | A1* | 3/2014 | Yoshida | G06F 11/1484 |
| | | | | 718/1 |
| 2015/0338835 | A1* | 11/2015 | Holler | G05B 19/058 |
| | | | | 700/79 |
| 2017/0277151 | A1* | 9/2017 | Liu | G05B 9/03 |
| 2019/0034256 | A1* | 1/2019 | Fox | G06F 21/57 |

* cited by examiner

METHOD AND ARRANGEMENT FOR OPERATING TWO REDUNDANT SYSTEMS

BACKGROUND OF THE INVENTION

1. Field of the Invention

The invention relates to methods for operating an arrangement having two redundant systems, and to an arrangement having two redundant systems.

2. Description of the Related Art

In industrial automation engineering, but also in other technical fields, there are instances of use in which increased availability ("high availability") is called for. In contrast to security against manipulation, which is often summarized under the heading "Security", "high availability" is primarily about keeping random failures of subsystems or components under control. This is supposed in particular to involve failure of a subsystem, in particular of a controller (e.g., a programmable logic controller, or control computer), being detected and offset, and disturbances that cannot immediately be established as complete failure of a system, but rather are found to be a malfunction, for example, are also supposed to be detected as a fault situation and offset.

For this purpose, high availability controllers are known that have what is known as dual structural redundancy. In these arrangements, two systems or controllers operate at the same time during normal operation and regularly reciprocally check the computed results. If the results do not match, then an attempt is made to shut down the faulty controller through the use of additional diagnostic measures and to reintegrate it into operation only after repair. For the most part, one of the systems operates in a productive mode, which means that the results, in particular the actuation for actuators of a process to be controlled, are used while the system operated "redundantly" in parallel performs the same calculations, and its results are used to check the result of the respective other system. If the system in the productive mode fails or faults are found, it is possible to change over to the redundant system, i.e., the system running in "shadow mode" hitherto, almost without delay. If disturbances are found in the redundant system (shadow system), the previous productive system ("master") continues in its role and the faulty system is shut down and, by way of example, restarted or repaired.

A challenge for a redundant parallel mode of this kind is to detect which of the systems or controllers is or was faulty. The quality of this detection has a great influence on the ultimate achievable mean time between failures (MTBF) for the overall system, and hence directly on the costs attributable to failures and/or disturbances.

FIG. 2 depicts the ratio of the mean time between failures (MTBF) of a redundant system ($MTBF_{system}$) and a single system ($MTBF_{single}$) based on the degree of fault coverage (diagnostic coverage (DC)). With a low degree of fault coverage (DC<60%), the ratio is approximately one, which means that the redundant overall system is statistically no better than a single, nonredundant system. The MTBF of the redundant overall system increases superlinearly with the degree of fault coverage (DC), as a result of which it becomes clear that the latter plays a prominent part in the improvement of the overall system. The depiction in FIG. 2 is based on a model that describes a Markov chain with three states, MTTF (mean time to failure)=1000 h, MTTR (mean time to repair)=4 h.

Thus, if, without further information, it is merely found that there is a disparity between the productive system and the shadow system, then the configuration comprising two systems operated in parallel affords no significant advantage over a single-system solution, because in half of the cases the defective system is randomly continued to be operated. A known but complex way of improving the situation is to use three instead of two systems and to employ majority logic ("triple modular redundancy"). Such majority solutions are complex for understandable reasons, however, and are therefore supposed to be avoided in many cases.

Additionally, a large number of faults can be spotted by concurrent test programs with a known result. In this case, besides the actual application program or automation program on each system, further tasks are accomplished, such as arithmetic tasks or calculations, the results of these calculations already being known in advance. If the respective computation result differs from the previously known desired result, a fault in the respective control logic or the respective system can be inferred. These methods are less suitable for detecting transient "one-off faults", however, that is to say in particular faults that do not relate to all operations and calculations in the respective system.

In some cases, it is also possible for specific sensors, in particular temperature sensors, to be used for spotting faults in single systems.

If the aforementioned mechanisms fail, only the arbitrary selection remains in the detected fault situation (e.g. "random" or "master continues to operate, reserve is shut down"). In this case, however, as already mentioned above, it is necessary to assume with 50% probability that the still intact node or the still intact system is shut down.

SUMMARY OF THE INVENTION

In view of the foregoing, it is thus an object of the present invention to improve the detection of the faulty system in dual redundancy systems.

This and other objects and advantages are achieved in accordance with the invention by measuring operating parameters, in particular what is known as a "performance", of individual parts of the system program or user program of the respective system. For each system, the operating parameter or operating parameters is/are picked up statistically. If a disparity arises between the two systems (master and reserve or productive system and shadow system), it is possible to check whether the most recently picked-up operating parameter(s) in one of the systems has a greater disparity than the previously executed cycles. That system in which the current operating parameter or the current operating parameters has/have a greater disparity than the statistical recordings, such as a mean value of the respective parameter under consideration, is detected as the system that is probably faulty.

The object is particularly achieved by a method and an arrangement, wherein the method operates an arrangement having two redundant systems, in particular two industrial automation components, where the two systems each operate in parallel in a cyclic mode, where one of the systems operates in a productive mode each time and the other system executes the same task for checking purposes, wherein the systems regularly check at least one result of the respective other system, in particular each compare the result of the other system of the two systems with their own result, and where a detected disparity among the results leads to a fault being detected, with one of the systems being selected or confirmed for the productive mode in the fault situation. Here, at least one respective characteristic variable concerning an operating parameter is picked up for each of the systems in multiple or all cycles and used to update at least one statistical parameter each time, where at least when a disparity between the results of the two systems is found, a current operating parameter is correlated with the associated statistical parameter of the same system for each system, and where the system for which the respective current operating parameter differs from the associated statistical parameter is detected as the correctly operating system and used for the further productive mode. This method allows the degree of fault coverage (DC=diagnostic coverage) to be increased and hence the availability of the overall system to be increased.

It is also an object to provide an arrangement having two redundant systems, in particular having two industrial automation components, where the two systems operate in parallel in a cyclic mode, where one of the systems is switched to a productive mode each time and the other system executes the same task for checking purposes, where the systems to reciprocally check results of the respective other system once or on a regular basis, in particular by virtue of the respective result of the respective other of the two systems being compared with their own result, and where a detected disparity among the results leads to a fault being detected, where one of the systems to be selected for the further productive mode or confirmed for the productive mode in the fault situation. Here, at least one respective characteristic variable concerning an operating parameter is picked up for each of the systems in multiple or all cycles and used for updating at least one statistical parameter each time, where at least when a disparity between the results of the two systems is found, a current operating parameter is correlated with the associated statistical parameter of the same system for each system, and where the system for which the respective current operating parameter differs from the associated statistical parameter less is detected as the correctly operating system and used for the productive mode. Such an arrangement allows the advantages already discussed with reference to the method in accordance with the invention to be achieved.

The alternate checking occurs at least once, preferably on a regular basis, in particular after each cycle of a cycle-oriented program (e.g., automation application). In an advantageous embodiment, a user can administrate the type and frequency of the data comparison, in particular under time control, under cycle control or under event control.

An operating parameter that can be used is advantageously a program runtime, in particular the runtime for executing a complete cycle or a program part (e.g., functional modules) that is advantageously executed imperatively in each cycle. Such a program runtime or cycle duration can be picked up easily and without much influence on the system performance, it being assumed that a significantly different runtime or execution period than on statistical average means that there is a disturbance. Regular disparities in the execution period, which can occur regularly, for example, as a result of a regular complex calculation or as a result of an altered sequence structure owing to conditional branches or the like, are not misinterpreted in this case because precisely the statistical disparities on the two systems are compared with one another. Consequently, in the event of regular runtime alterations these lead to disparities in the present, current program runtime in comparison with the statistical mean in both systems in equal measure and therefore erroneously report no fault during regular operation. This also applies to disparities in other operating parameters.

Advantageously, an operating parameter that can be used is what is known as a "performance counter", such performance counters being readily available for a multiplicity of operating systems and architectures (see, e.g., Willhalm et al., "Intel Performance Counter Monitor-A better way to measure CPU Utilization", Aug. 16, 2012) In accordance with the invention, benefit is drawn from the insight that an altered performance of a system may be founded on disturbances in the software or the hardware, so that temporary disparities in these performance indices in the two systems can be compared and in this case can provide an indication of which of the systems is faulty and which is operating regularly. In accordance with the invention, it is assumed that the system having the larger alterations in performance indices in comparison with the statistical average is probably the faulty system.

Advantageously, not only is an individual operating parameter, for example, a runtime statement or a performance index, observed as an operating parameter, but rather a multiplicity of characteristic variables are picked up, this multiplicity of characteristic variables either being able to be combined to form a set of statistical parameters, in particular a parameter vector or a parameter matrix, or else being combined to form a single, overall statistical parameter. As the number of processed characteristic variables, performance indices or runtime statements increases, so too does the probability of anomalies being able to be detected. Here, the combination to form individual statistical parameters or parameter vectors ensures that at the end of a cycle the comparison of the current operating parameters with the local statistical parameters, on the one hand, and the comparison of the disparity in the productive system with the disparity ascertained in the shadow system can be effected as easily and quickly as possible.

To pick up brief, transient disturbances, it is advantageous if operating parameters are picked up in many program blocks and therefore feature in the statistical comparison. Advantageously, however, preferably such program parts as are executed in each cycle as far as possible are considered in this case, as a result of which disparities that arise through the sporadic execution of rarely used branches and program parts will feature less in the result.

To generate and pick up operating parameters, the program code of the user program and advantageously also of an operating system or of a piece of firmware is provided with commands, i.e., program commands, for producing and picking up the operating parameters. Generation can alternatively also be effected by the operating system, however.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The method according to the invention is explained below on the basis of an exemplary embodiment; the exemplary embodiment is used at the same time to explain an arrangement according to the invention, in which.

DETAILED DESCRIPTION OF THE EXEMPLARY EMBODIMENTS

Figure 1:
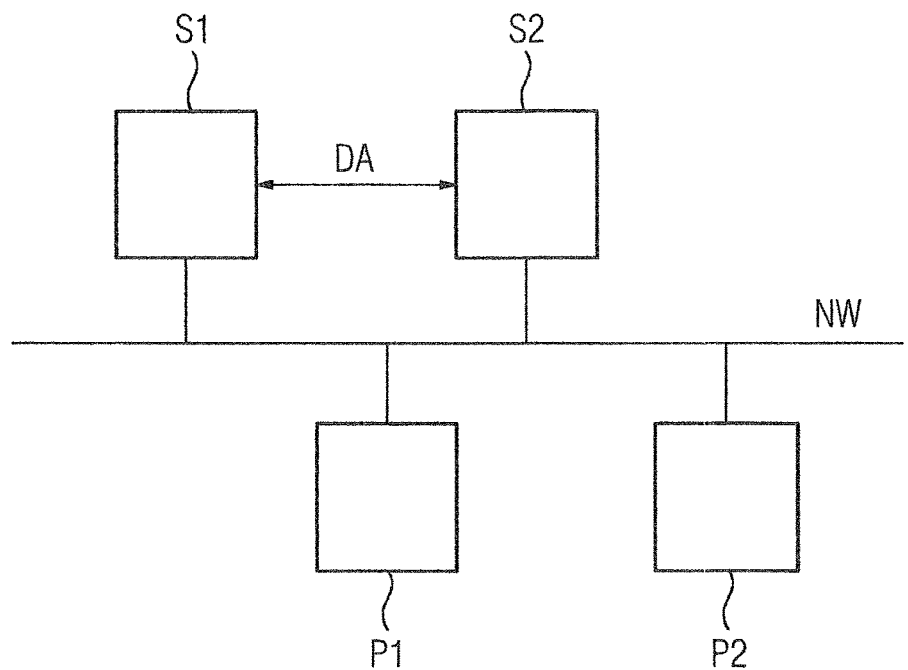
FIG. 1 shows a schematic depiction of two redundantly operated systems linked via a network having two production means.

FIG. 1 depicts two systems S1, S2 (also called "nodes") operating in parallel in a redundant mode. A network NW, such as an automation network, connects the systems S1, S2 to production units P1, P2 and also to one another for a data interchange DA, the production units P1, P2 being controlled by the systems S1, S2. It is assumed that one of the systems S1, S2 operates in the productive mode (master), i.e., actually controls the production device P1, P2, while the other system S1, S2 executes the same software (operating system, application program, automation program) in a shadow mode (slave) using the same input data (e.g., process parameters, measured values), but the results are used only for checking the respective other system S1, S2. If one of the systems S1, S2 fails, or is detected as faulty, the respective other system S1, S2 undertakes the production mode or continues it while the faulty system S1, S2 is repaired, such as via a restart.

Figure 2:
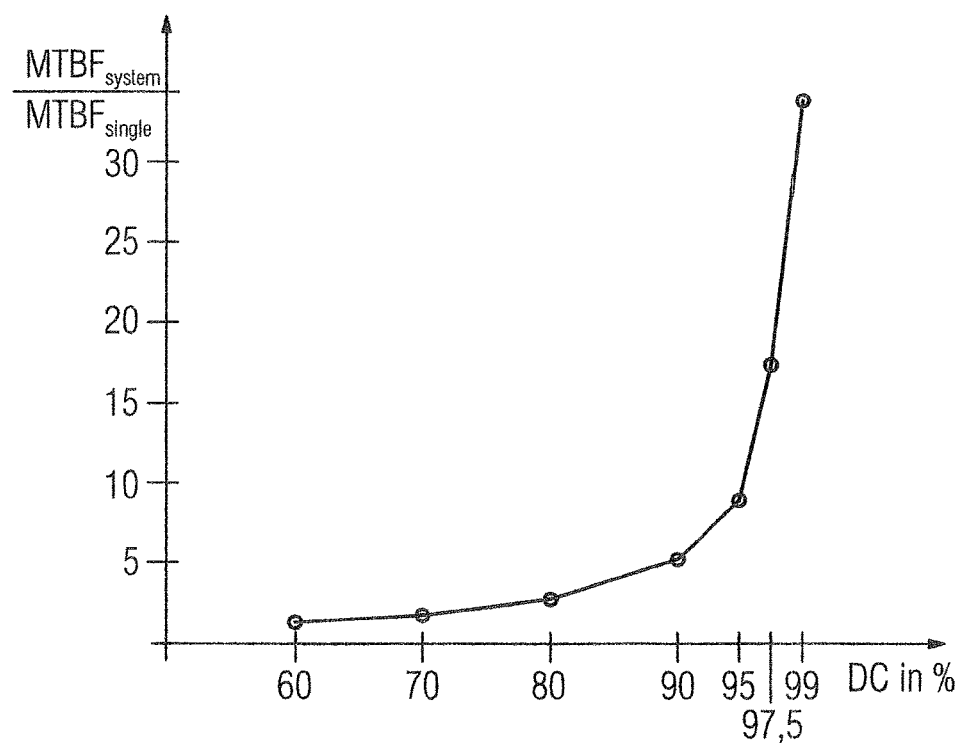
FIG. 2 is a graphical plot showing the dependency of the availability of an arrangement comprising two systems in comparison with a single system based on a degree of fault coverage.

FIG. 2 depicts the ratio of the mean time between failures (MTBF) of a redundant system (MTBF$_{system}$) and a single system (MTBF$_{single}$) based on the degree of fault coverage (diagnostic coverage—(DC)). As already described at the outset, the degree of fault coverage (DC) and therefore the safety of the diagnosis of which of the differing systems S1, S2 is faulty are essential for increasing the dependability and availability of the overall system.

The method in accordance with the invention is based on the measurement of the performance of individual parts of the operating system, or of the firmware (system programs) and/or the user program. The user program is normally the software component most susceptible to fault and can also most easily be provided with diagnosis instructions. As a result, the application program is for the most part moved to the focus of the examinations under consideration here. Operating parameters are picked up in this case. To this end, it is possible for the runtime to be measured, and/or what are known as performance counters of the respective (individual) system S1, S2 are ascertained, which a modern CPU usually provides.

The exemplary embodiment is based on programmable logic controllers as considered systems S1, S2, these executing an automation task (e.g., production control or process automation) in cycles. For each cycle, approximately 10-1000 of these measured values are ascertained for operating parameters and, normally, at the end of the cycle, variables derived on each of the two nodes, i.e., statistical parameters, are computed therefrom. In a simple case, these are the mean value and variance for each measured value of an operating parameter.

In the event of a fault, i.e., if the reciprocal comparison of the two systems S1, S2 or nodes fails or exhibits discrepancies, each of the two systems S1, S2 or each of the nodes uses the previously computed derived variables, i.e., the statistical parameters, to ascertain whether the current measured values of the operating parameters allow an anomaly, i.e., a fault, to be inferred. The disparity in the current measured value of an operating parameter from its continually updated statistical parameter is what is known as an "anomaly value" in this case. If one of the systems S1, S2 or nodes has computed a very much higher anomaly value than the other, it makes sense to shut down this system or to remove it from the productive mode, and to allow the other system to continue to run in the productive mode or to transfer it from the shadow mode to the productive mode. For the comparison, a data interchange DA between the systems S1, S2 (if the systems S1, S2 monitor one another) or between each system S1, S2 and an evaluating entity (not depicted in the figures) can be provided.

The use of the comparison of the anomaly values as a selection criterion can be justified in that many faults, in particular hardware faults, can have an influence of the performance of one or more program parts. A few examples may be cited here in this regard:

A fault in the memory access unit (MMU) results in faulty addresses being accessed. There is a high probability of these not being in the cache. As a result, the cache fault rate and hence the program runtime increase.

A fault in the arithmetic and logic unit terminates computing operations too early, resulting in an altered runtime response.

A fault in the control unit or distortion of loop counters means that the correct number of loop passes is not executed, resulting in an altered runtime response.

The distortion of a process value means that "rarely executed" program parts are executed, resulting in an unusual runtime response.

Distortion of the program also usually results in alterations in the runtime.

Together with the certainty that at least one of the two systems S1, S2/nodes must be faulty, a high anomaly in the runtime response is thus a strong indication of there being an abnormal response. Here, the current anomaly values of the two systems S1, S2 are compared in order to determine, in the event of a fault, the system that has the higher probability of being the faulty system. Thus, regular fluctuations in the operating parameters have no effect on the decision because they arise on both systems S1, S2 in equal measure during correct operation.

The proposed measures allow the sometimes 50% probability of the wrong node being shut down to be reduced significantly. It should be noted that lowering it to just 30% would already lead to a significant increase in the MTBF (and hence to a reduction in failure-conditional costs for an operator)—in this regard see also FIG. 2.

A specific exemplary embodiment assumes that the cyclically executed program can be broken down at the topmost level into a suitable number (approximately 10-1000) of sequentially executed blocks. This means that loops and case distinctions occur only inside these blocks. The blocks can contain system functions (e.g. driver calls) or user-programmed functions (e.g. reading and processing of sensor data, comparison of data with one another and against constant desired values, Boolean combination of the comparison results or calculation of control values).

Each program block is instrumented by the generating chain (e.g. engineering system, in particular compiler) to the effect that one or more measured values (runtime, or number of cache hits) are produced for this block in each cycle. Overall, N measured values (x_1 to x_N) are generated in a cycle for all blocks.

For each measured value x_i, the two variables M_i and S_i are furthermore created, which store the mean value and the variance of the value. These values are initialized (for all i from 1 . . . N) after the first cycle as follows:

```
init_i(in x_i,out M_i, out S_i){
    M_i := x_i;
    S_i := 0;
}
```

From the second cycle onward, the values are updated ("update" function) as follows, the variable k being a global cycle counter:

```
update_i(in k,inout M_i, inout S_i){
    Mlast := M_i;
    M_i := Mlast + (x_i-Mlast)/k;
    S_i := S_i + (x_i-Mlast)*(x_i-M_i);
}
```

This update involves recurrence equations for the mean value and the variance, cf. D. Knuth: The Art of Computer Programming, 3rd Ed., Chapter 4.2.2., page 232. It should be noted that S_i can never be negative in this case.

If a fault occurs (i.e. the outputs from the master and the reserve or the productive system and the shadow system do not match), each of the two nodes can compute the "anomaly values" of the most recently measured values. Instead of the "update" function, the "calcAnomalyValue" function is then called (again for all i from 1 . . . N):

```
calcAnomalyValue(in x_i, M_i, S_i, out aValue_i){
    squaredDiff := (M_i-x_i)*(M_i-x_i);
    if (S_i <= epsilon)     aValue_i := MAX_A_VALUE;
    else                    aValue_i := squaredDiff / S_i;
}
```

The more the current value x_i differs from the average value M_i, the higher is its anomaly, where values with a high variance S_i are weighted less strongly.

By adding the values aValue_i, each of the two nodes can independently calculate a total anomaly value. If in doubt, the node having the higher value is shut down, this being able to be accomplished via a data interchange DA transmitting the node's own anomaly value to the neighboring node, and vice versa. In an advantageous embodiment, a node itself (provided it is still operational) decides whether it needs to be shut down/repaired, or can be operated further. In another embodiment, this decision is undertaken by a central entity, such as a central operational controller or a "watchdog" device based on the anomaly values found.

In the exemplary embodiment, the statistical evaluation of the operating parameters can be refined further, such as by taking into consideration the distribution function for individual x_i or taking into consideration dependencies between the x_i belonging to the same program section. Further, dependencies between x_i of different program sections can be taken into consideration. Further, a historic evolution of an x_i can occur, where it is also possible to take into consideration dependencies pertaining to the current and historic process input values.

Figure 3:
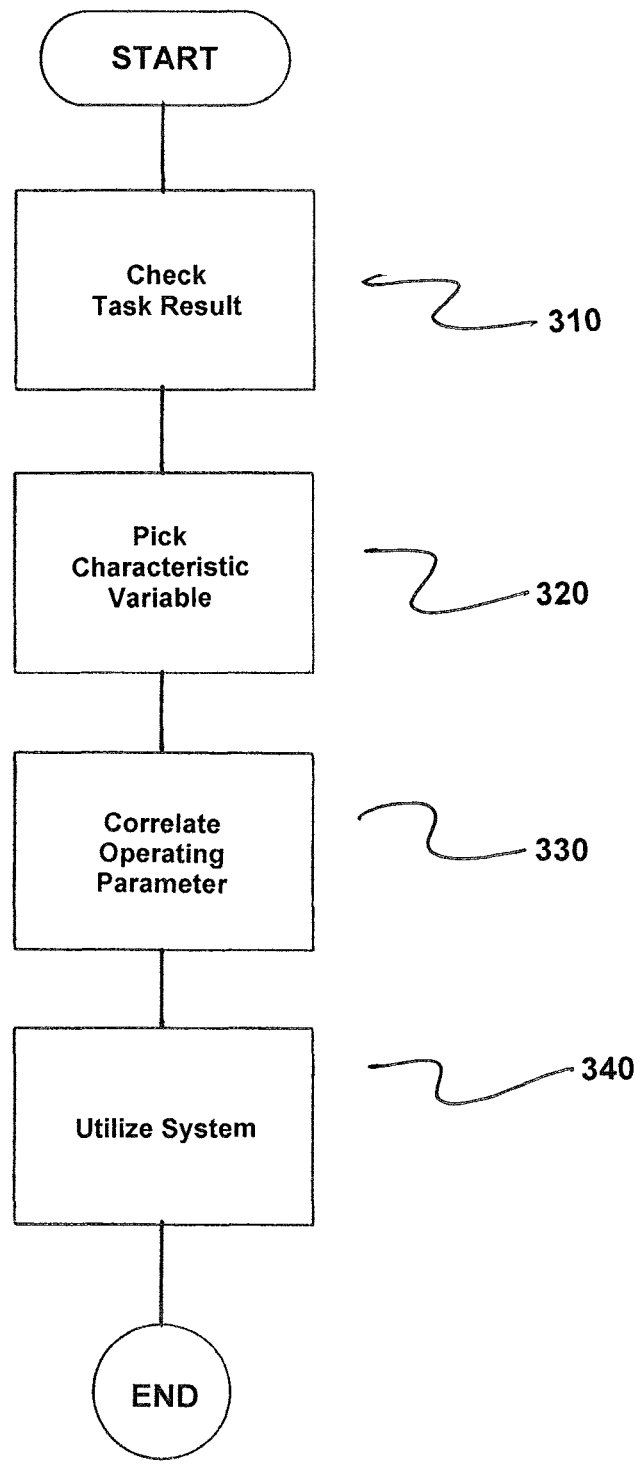
FIG. 3 is a flowchart of the method in accordance with the invention.

FIG. 3 is a flowchart of a method for operating an arrangement having two redundant systems S1, S2 each operating in parallel in a cyclic mode, one system of the two systems S1, S2 operating in a productive mode each time and another system of the two systems S1, S2 executing the same task for checking purposes. The method comprises checking reciprocally by the two systems S1, S2 at least one result of a task of a respective other system on a regular basis, as indicated in step 310. In accordance with the invention, each system of the two systems S1, S2 compares a result of the task of the other system of the two systems S1, S2 with their own result, where a detected fault comprising a detected disparity among the results leads to a fault situation being found, with one of the systems S1, S2 being selected or confirmed for the productive mode in the fault situation found.

Next, at least one respective characteristic variable concerning an operating parameter is picked up for each of the systems S1, S2 in multiple or all cycles and using the picked up at least one respective characteristic variable for updating at least one statistical parameter each time, as indicated in step 320.

Next, a current operating parameter is correlated with the associated statistical parameter for each system S1, S2 at least when a disparity between the results of the two systems S1, S2 is found, as indicated in step 330.

Next, the system S1, S2 for which the respective current operating parameter differs from the associated statistical parameter less is detected as the correctly operating system S1, S2 is utilized as the productive mode, as indicated in step 340.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A method for operating an arrangement having two redundant programmable logic controllers each operating in parallel in a cyclic mode, one programmable logic controller of the two programmable logic controllers operating in a productive mode each time and another programmable logic controller of the two programmable logic controllers executing the same task for checking purposes, the method comprising:

checking reciprocally by the two programmable logic controllers at least one result of a task of a respective other system on a regular basis, each programmable logic controller of the two programmable logic controllers comparing a result of the task of the other programmable logic controller of the two programmable logic controllers with their own result, a detected fault comprising a detected disparity among the results leads to a fault situation being found, with one of the two programmable logic controllers being selected or confirmed for the productive mode in the fault situation found;

picking up at least one respective characteristic variable concerning an operating parameter for each of the two programmable logic controllers in multiple or all cycles and using the picked up at least one respective characteristic variable for updating at least one statistical parameter each time;

correlating a current operating parameter with the associated statistical parameter for each programmable logic controller at least when a disparity between the results of the two programmable logic controllers is found; and utilizing the programmable logic controller for which the respective current operating parameter differs from the associated statistical parameter less is detected as the correctly operating programmable logic controller as the productive mode.

2. The method as claimed in patent claim 1, wherein the operating parameter used comprises a program runtime comprising a runtime for executing a complete cycle or a program part executed in a cycle each time.

3. The method as claimed in claim 1, wherein the operating parameter used is at least one performance counter for specifying a performance index of the respective programmable logic controller.

4. The method as claimed in claim 1, wherein a multiplicity of characteristic variables are picked up as operating parameters and combined to form one of (i) a set of statistical parameters and (ii) a single overall statistical parameter.

5. The method as claimed in claim 1, wherein commands for picking up the operating parameters are inserted in an application program of the two programmable logic controllers that is executed in each cycle.

6. The method as claimed in patent claim 5, wherein the commands are inserted in a number of program blocks that are executed independently of branches or conditions in each cycle.

7. An arrangement comprising:
two programmable logic controllers which operate in parallel in a cyclic mode, one programmable logic controller of the two programmable logic controllers being switched to a productive mode each time and another programmable logic controller of the two programmable logic controllers executing the same task for checking purposes;

wherein, by virtue of a respective result of a task of a respective other programmable logic controller of the two programmable logic controllers is compared with their own result of the task by the two programmable logic controllers to reciprocally check results of the respective other programmable logic controller on a regular basis;

wherein one of (i) a detected fault and (ii) a detected disparity among the results leads to a fault situation being found;

wherein one programmable logic controller of the two programmable logic controllers is one of (i) selected for the productive mode and (ii) confirmed for the productive mode in the fault situation;

wherein at least one respective characteristic variable concerning an operating parameter is picked up for each of the two programmable logic controllers in multiple or all cycles and used to update at least one statistical parameter each time;

wherein, at least when a disparity between the results of the two programmable logic controllers is found, a current operating parameter is correlated with the associated statistical parameter for each programmable logic controller; and wherein the programmable logic controller for which the respective current operating parameter differs from the associated statistical parameter less is detected as the correctly operating programmable logic controller and used for the productive mode.

8. The arrangement as claimed in claim 7, wherein the operating parameter used forms a program runtime comprising a runtime for executing a complete cycle or a program part executed in a cycle each time.

9. The arrangement as claimed in claim 7, wherein the operating parameter used is at least one performance counter for specifying a performance index of the respective programmable logic controller.

10. The arrangement as claimed in claim 8, wherein the operating parameter used is at least one performance counter for specifying a performance index of the respective programmable logic controller.

11. The arrangement as claimed in claim 7, wherein a multiplicity of characteristic variables to be picked up as operating parameters are combined to form one of (i) a set of statistical parameters and (ii) a single overall statistical parameter.

12. The arrangement as claimed in claim 8, wherein a multiplicity of characteristic variables to be picked up as operating parameters are combined to form one of (i) a set of statistical parameters and (ii) a single overall statistical parameter.

13. The arrangement as claimed in claim 9, wherein a multiplicity of characteristic variables to be picked up as operating parameters are combined to form one of (i) a set of statistical parameters and (ii) a single overall statistical parameter.

14. The arrangement as claimed in claim 7, wherein commands for picking up operating parameters are inserted in an application program of the two programmable logic controllers which is executed in each cycle.

15. The arrangement as claimed in claim 14, wherein the commands to be inserted in a number of program blocks are executed independently of branches or conditions in each cycle.

* * * * *